Patented June 23, 1936

2,045,097

UNITED STATES PATENT OFFICE 2,045,097

TREATMENT OF MILK PRODUCTS

Herbert E. Otting, Westerville, Ohio, assignor to M & R Dietetic Laboratories, Inc., a corporation of Ohio No Drawing. Application August 29, 1931, Serial No. 560,242

30 Claims. (Cl. 99—60)

The present invention relates to improvements in the treatment of milk and milk products, more particularly to effect a change or adjustment of the calcium and phosphate content to adapt them for use in the preparation of infants' food, milk sugar and the like.

In cow's milk and the readily available milk products derived particularly from cow's milk, such as skim milk, whey, and the like, the proportions of calcium and phosphates are excessively large for certain special dieting purposes and for the proper utilization of the products in many ways. Thus, in the preparation of readily digestible milk products and infants' food, the comparatively large proportions of calcium and phosphates in milk and skim milk cause the production of large curds which are not readily digestible or assimilable and which may lead to serious digestive disorders. Similarly whey contains constituents, such as its sugar of milk and albumen which are highly desirable as constituents of food products, but the whey cannot be employed for certain purposes because of the effects of its unduly large calcium and phosphate ion ratios. Similarly the large calcium and phosphate content of milk products from cows and other animals must be reduced in the production of products simulating human milk in their composition.

I have found that either or both the calcium and phosphate ion content of such milk or milk products, particularly those derived from cow's milk, may be reduced without materially affecting the remaining constituents of the milk by contacting the milk or liquid milk products with normally inert adsorptive materials, such as silica gel, hydrated silica, fuller's earth, or Florida clay, which have been activated by suitable treatment with an alkali and/or a solution of an alkali metal halide, as more fully hereinafter set forth.

In accordance with this invention, a normally inert adsorptive material, such as silica gel, preferably after moistening, is contacted with a solution of a caustic alkali or other OH-ion yielding body, such as sodium hydroxide and then treated with a solution of an alkali metal salt, yielding an alkali-metal ion, such as sodium chloride. The adsorptive material is then found to be activated from the standpoint of capability for ion removal from solutions, particularly with reference to calcium and phosphate ion removal. A liquid milk product such as milk, skim milk, whey or the like in a slightly acid condition is then brought into contact with the activated silica gel either by percolation, upflow contact, filtration or by simple admixture, and on removal therefrom the proportions both of CaO and $P_2O_5$ to total solids therein is found to be decreased to a substantial extent. The extent of decrease may be controlled by regulation of several factors, individually or together, such as the relative proportions of the activated adsorptive material to the milk product, the acidity of the latter, and to some extent the degree of activation of the adsorptive material.

For example, skim milk may vary in its proportion of CaO from 0.181% to 0.290% with an average of about 0.201% and may vary in its proportion of $P_2O_5$ from 0.221 to 0.273%, with an average of approximately 0.250. In whole milk the calcium and phosphate ion content is slightly less due to higher fat content. The average CaO content of whole milk is about 0.193% and the $P_2O_5$ content about 0.240%. The CaO and $P_2O_5$ content of the milk, or skim milk, may be lowered in accordance with the present invention by treatment of the milk, skim milk, or other milk fluids, with a suitable activated adsorptive material such as silica gel, the proportion of the latter being in general in excess of 20% by weight of the milk.

In this treatment, I preferably reduce the CaO content of the milk fluid, as whole or skim milk, below 0.130% and preferably to 0.100% or lower, and the $P_2O_5$ content to below 0.205% and preferably to 0.200 or lower in a single operation. However, in the event that it is desired not to reduce the content of either the CaO and $P_2O_5$ to this extent, it is possible to control the treatment so as to remove a less proportion or substantially more of the lime or the phosphate content while removing the specified percentage or less of the other.

In carrying out the process, contact with the adsorptive material is secured either by a mixing process or by percolation of the milk fluid through the activated absorptive material either by an upflow or downflow course to secure the full effects of the latter, a contact period of from fifteen minutes upwards being in general desirable when the mixing process is practiced. Acidity of the milk of at least 0.15% and preferably exceeding 0.20% (calculated as lactic acid), is maintained, slight additions of hydrochloric or other innocuous acid such as lactic or pure sulfuric acid being made, if necessary, to compensate for the neutralizing action of the activated adsorptive material employed. On removal of the treated milk fluid a substantial reduction in CaO and $P_2O_5$ content of the fluid is found to have taken place.

The normally inert adsorptive material, such as silica gel, suitably after washing with water, is activated by treating it with suitable proportion, say 1 to 10% of its weight (dry) of soluble alkali, yielding an OH ion, suitably caustic alkali in moderately dilute solution. The adsorptive material is then well washed with water, contacted with a strong solution of an ionizable alkali salt, such as sodium chloride, and the adsorptive material again well washed with water.

The spent adsorptive material may be revivified by the same treatment initially used to activate the material.

In the event that it is desired to remove only the calcium or the phosphate ion, such result may be accomplished in the case of the phosphate ion by saturating the activated adsorptive material with ions of a metal of a higher group than the alkali metals, for example, calcium, magnesium, iron or aluminum, or with hydrogen ions, for example by washing with a solution of a soluble and ionizable salt of such metals, such as calcium chloride prior to treatment of the milk, or the same result may be obtained by revivifying a spent adsorptive material by the use of a caustic alkali only.

If it is desired to remove only the calcium ion, the activated adsorptive material may, prior to treatment of the milk therewith, be saturated with phosphate ions by washing with a solution of a soluble and ionizable phosphate such as sodium phosphate. The same result may be accomplished by revivifying a spent adsorptive material with an alkali halide only.

For example, in the preparation of a skim milk product for use in production of a compounded infants' food, I may proceed as follows:

200 grams of dry silica gel, for example that commercially designated grade A, 30 to 40 mesh, was weighed out and found to absorb about an equal amount of water, making approximately 400 grams of moist silica gel. The silica gel was then contacted with five grams of sodium hydroxide dissolved in 200 cc. of water, for example, by down-flow percolation, and was then well washed with water. 15 grams of sodium chloride dissolved in 100 cc. of water was then contacted with the silica gel in a similar manner, and the gel again well washed with water. 600 cc. of skim milk, which had been raised to 0.26% acidity (calculated as lactic acid) by the addition of hydrochloric acid was then passed through the gel. The acidity of the milk dropped to 0.06%, calculated as lactic acid. The acidity of the milk was again raised to 0.23% (lactic acid) by adding hydrochloric acid and upon second passage through the gel showed 0.05% acidity. The treated product did not curdle when tested with rennet.

The skim milk had initially a CaO content of approximately 0.1918% and a $P_2O_5$ content of approximately 0.2405%. After the treatment, analysis showed a removal of .0710% of CaO, or 37% of the original content, and .0788% of $P_2O_5$, or 32.7% of the original, leaving in the solution a CaO content of 0.1208% and a $P_2O_5$ content of 0.1617%, calculated upon the original concentration of skim milk.

The spent silica gel is, suitably after washing with water, revivified by successive treatment with solutions of sodium hydroxide and sodium chloride, carried out in the same manner as in the activation of the material.

The invention may be employed not only upon skim milk, but upon whole milk, and milk products in general. By the use of this invention it is likewise possible to obtain advantages not otherwise possible in the preparation of compounded, easily digestible products. For example, where it has hitherto been the pratcice to build up the carbohydrate ratio of milk for dietary use by adding prepared sugar of milk, by the use of the present invention in reducing the CaO and $P_2O_5$ ratios of whey, it is possible to use the latter as a means of supplying sugar of milk in such products and at the same time take advantage of the residual protein matter in the form of albumen which is contained therein.

It will be readily apparent that the present invention may be used in reducing the $P_2O_5$ content of aqueous solutions generally, by contacting them with silica gel or other adsorptive material activated by treatment with solutions of hydroxyl ion-yielding electrolytes. The removal of phosphate ions from such solutions may be effected simultaneously with that of alkali metal ions, if desired, as in case of milk fluids specifically, in the same manner as such removal is effected in the case of milk fluids. Revivification of the spent activated silicas may be accomplished as described above.

By the use of the present invention, the complicated chemical methods involving double decomposition, formation of colloid gels and difficult centrifuging operations as hitherto employed in reducing the calcium and phosphate ion proportions of such products, are avoided. At the same time the necessary reduction in these constituents is secured to prevent the formation of large and difficultly assimilable curds from the treated products or the compounds in which they are incorporated, while at the same time not materially altering the other valuable constituents of the milk.

The invention may also be used in the preparation of milk and milk products for evaporation, cheese, ice-cream and casein making, and the like.

I claim:

1. The method of effecting the removal of phosphate ions from aqueous solutions containing the same which comprises subjecting silica gel to the action of a solution of a hydroxyl-ion-yielding electrolyte and contacting the silica gel with an aqueous solution containing phosphate ions.

2. The method of reducing the proportions of calcium and phosphate ions in liquid milk products which comprises contacting a normally inert adsorptive material with a solution of a hydroxyl-ion-yielding electrolyte and a solution of an alkali metal salt, and subsequently contacting the treated adsorptive material with the liquid milk product.

3. The method of reducing the proportions of calcium and phosphate ions in liquid milk products which comprises contacting silica gel with a solution of a hydroxyl-ion-yielding electrolyte and a solution of an alkali metal salt, and subsequently contacting the treated silica gel with the liquid milk product.

4. The method of reducing the proportions of calcium and phosphate ions in liquid milk products which comprises contacting silica gel with a solution of a hydroxyl-ion-yielding electrolyte and a solution of an alkali metal salt, and subsequently contacting the treated silica gel with the liquid milk product, while maintaining the liquid milk product in acid state.

5. The method of reducing the proportions of calcium and phosphate ions in aqueous solutions containing both calcium and phosphate which comprises contacting silica gel with a solution of a hydroxyl-ion-yielding electrolyte and a solution of an alkali metal salt, and subsequently contacting the treated silica gel with the aqueous solution, while maintaining the aqueous solution in acid state.

6. The method of reducing the proportions of calcium and phosphate ions in aqueous solutions containing both calcium and phosphate which comprises contacting a normally inert adsorptive material with a solution of a hydroxyl-ion-yielding electrolyte and a solution of an alkali metal salt, and subsequently contacting the treated absorptive material with the aqueous solution, while maintaining the aqueous solution in acid state.

7. The method of reducing the proportion of phosphate ions in aqueous solutions containing the same which comprises contacting a normally inert adsorptive material with an alkaline solution of a hydroxyl-ion-yielding electrolyte and subsequently contacting the treated adsorptive material with the aqueous solution while maintaining the aqueous solution in acid state.

8. The method of reducing the proportion of phosphate ions in aqueous solutions containing the same which comprises contacting a silica gel with an alkaline solution of a hydroxyl-ion-yielding electrolyte and subsequently contacting the silica gel with the aqueous solution while maintaining the aqueous solution in acid state.

9. The method of reducing the proportion of calcium and phosphate ions in skim milk which comprises successively contacting silica gel with a solution of sodium hydroxide and a solution of sodium chloride and subsequently contacting the treated silica gel with skim milk while maintaining the acidity of the skim milk at least at 0.20 per cent (calculated as lactic acid).

10. The method of removal of calcium and phosphate ions from aqueous solutions containing both said ions which comprises contacting the solution with a normally inert adsorptive material previously activated by being subjected to the action of a solution of caustic alkali and a solution of an alkali metal halide.

11. The method of removal of calcium and phosphate ions from aqueous solutions containing both said ions which comprises contacting the solution with a normally inert silica gel previously activated by being subjected successively to the action of a solution of caustic alkali and a solution of an alkali metal halide.

12. The method of removal of phosphate ions from aqueous solutions containing the same which comprises contacting the solution with a normally inert adsorptive material previously activated by being subjected to the action of a hydroxyl-ion-yielding electrolyte.

13. The method of removal of phosphate ions from aqueous solutions containing the same which comprises contacting the solution with silica gel previously activated by being subjected to the action of a hydroxyl-ion-yielding electrolyte.

14. The method of removal of phosphate ions from aqueous solutions containing said ions which comprises contacting the solution with a normally inert adsorptive material previously activated by being subjected successively to the action of a solution of a hydroxyl-ion-yielding electrolyte and a solution of a metal of a higher group than the alkali metals.

15. The method of removal of phosphate ions from aqueous solutions containing said ions which comprises contacting the solution with silica gel previously activated by being subjected successively to the action of a solution of a hydroxyl-ion-yielding electrolyte and a solution of a metal of a higher group than the alkali metals.

16. The method of reducing the proportions of calcium and phosphate ions in liquid milk products which comprises contacting said milk product with a normally inert adsorptive material previously activated by being subjected successively to the action of a solution of a hydroxyl-ion-yielding electrolyte and a solution of an alkali metal salt.

17. The method of reducing the proportions of calcium and phosphate ions in liquid milk products which comprises contacting said milk product with silica gel previously activated by being subjected successively to the action of a solution of a hydroxyl-ion-yielding electrolyte and a solution of an alkali metal salt.

18. The method of reducing the proportions of calcium and phosphate ions in liquid milk products which comprises maintaining said milk product in an acid state and contacting it with a normally inert adsorptive material previously activated by being subjected successively to the action of a solution of a hydroxyl-ion-yielding electrolyte and a solution of an alkali metal salt.

19. The method of reducing the proportions of calcium and phosphate ions in liquid milk products which comprises maintaining said milk product in an acid state and contacting it with silica gel previously activated by being subjected successively to the action of a solution of a hydroxyl-ion-yielding electrolyte and a solution of an alkali metal salt.

20. The method of reducing the proportions of calcium and phosphate ions in skim milk which comprises maintaining the acidity of the skim milk at least at 0.20% (calculated as lactic acid) and contacting said milk with silica gel previously activated by being subjected successively to the action of a solution of sodium hydroxide and a solution of sodium chloride.

21. The method of reducing the proportions of calcium and phosphate ions in aqueous solutions containing both ions which comprises maintaining the solution in an acid state and contacting it with a normally inert adsorptive material previously activated by being subjected successively to the action of a solution of a hydroxyl-ion-yielding electrolyte and a solution of an alkali metal salt.

22. The method of reducing the proportions of calcium and phosphate ions in aqueous solutions containing both ions which comprises maintaining the solution in an acid state and contacting it with silica gel previously activated by being subjected successively to the action of a solution of a hydroxyl-ion-yielding electrolyte and a solution of an alkali metal salt.

23. The method of reducing the proportions of phosphate ions in aqueous solutions containing said ions which comprises maintaining the solution in an acid state and contacting it with a normally inert adsorptive material previously activated by being subjected to the action of a solution of a hydroxyl-ion-yielding electrolyte.

24. The method of reducing the proportions of phosphate ions in aqueous solutions containing said ions which comprises maintaining the solution in an acid state and contacting it with silica gel previously activated by being subjected to the action of a solution of a hydroxyl-ion-yielding electrolyte.

25. The method of reducing the proportions of phosphate ions in aqueous solutions containing said ions which comprises maintaining the solution in an acid state and contacting it with a normally inert adsorptive material previously activated by being subjected to the action of a solution of a caustic alkali and a solution of a metal of a higher group than the alkali metals.

26. The method of reducing the proportions of phosphate ions in aqueous solutions containing said ions which comprises maintaining the solution in an acid state and contacting it with silica gel previously activated by being subjected to the action of a solution of a caustic alkali and a solution of a metal of a higher group than the alkali metals.

27. The method of effecting the removal of calcium and phosphate ions from aqueous solutions containing both calcium and phosphate ions which comprises successively subjecting a normally inert adsorptive material to the action of a solution of a caustic alkali and a solution of an alkali metal halide and contacting the treated inert material with an aqueous solution containing calcium and phosphate ions.

28. The method of effecting the removal of calcium and phosphate ions from aqueous solutions containing both calcium and phosphate ions which comprises successively subjecting a normally inert silica gel to the action of a solution of a caustic alkali and a solution of an alkali metal halide and contacting the treated inert material with an aqueous solution containing calcium and phosphate ions.

29. The method of effecting the removal of phosphate ions from aqueous solutions containing the same which comprises subjecting a normally inert adsorptive material to the action of a solution of a hydroxyl-ion-yielding electrolyte and contacting the treated inert material with an aqueous solution containing phosphate ions.

30. The method of reducing the proportions of calcium and phosphate ions in liquid milk products which comprises the steps of contacting a normally inert adsorptive material with a solution of hydroxyl-ion-yielding electrolyte and a solution of an alkali metal salt, and subsequently contacting the treated adsorptive material with the liquid milk product, while maintaining the liquid milk product in acid state.

HERBERT E. OTTING.

---

CERTIFICATE OF CORRECTION.

atent No. 2,045,097.   June 23, 1936.

HERBERT E. OTTING.

It is hereby certified that error appears in the printed specification of he above numbered patent requiring correction as follows: Page 2, second olumn, line 75, claim 5, and page 3, first column, line 9, claim 6, after the ord "phosphate" insert ions; page 3, first column, line 13-14, claim 6, for absorptive" read adsorptive; and that the said Letters Patent should be ead with these corrections therein that the same may conform to the record f the case in the Patent Office.

Signed and sealed this 11th day of August, A. D. 1936.

Henry Van Arsdale

Seal)   Acting Commissioner of Patents.

CERTIFICATE OF CORRECTION.

Patent No. 2,045,097. June 23, 1936.

HERBERT E. OTTING.

It is hereby certified that error appears in the printed specification of the above numbered patent requiring correction as follows: Page 2, second column, line 75, claim 5, and page 3, first column, line 9, claim 6, after the word "phosphate" insert ions; page 3, first column, line 13-14, claim 6, for "absorptive" read adsorptive; and that the said Letters Patent should be read with these corrections therein that the same may conform to the record of the case in the Patent Office.

Signed and sealed this 11th day of August, A. D. 1936.

(Seal)

Henry Van Arsdale
Acting Commissioner of Patents.